Figure 1:
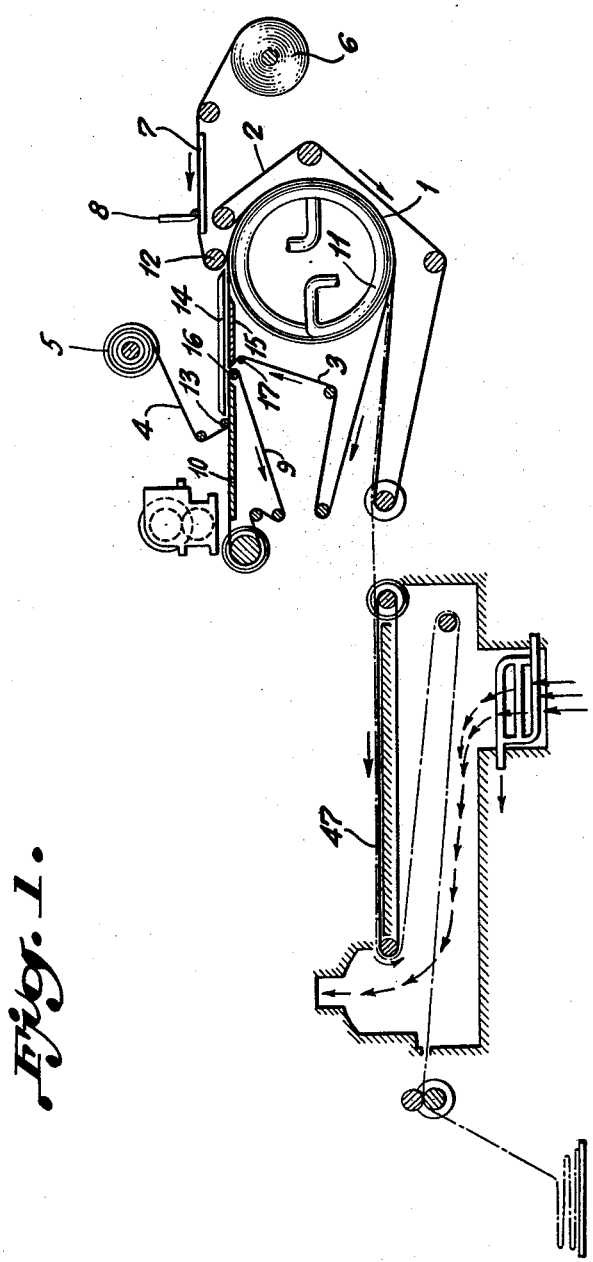

INVENTOR
P. F. SAPILEVSKY

INVENTOR
P. F. SAPILEVSKY

BY
ATTORNEYS

June 29, 1965 P. F. SAPILEVSKY 3,192,085
PROCESS OF MANUFACTURING IMITATION PERSIAN LAMB CLOTH
AND MACHINE FOR PRODUCING THE SAME
Filed April 4, 1960 5 Sheets-Sheet 4
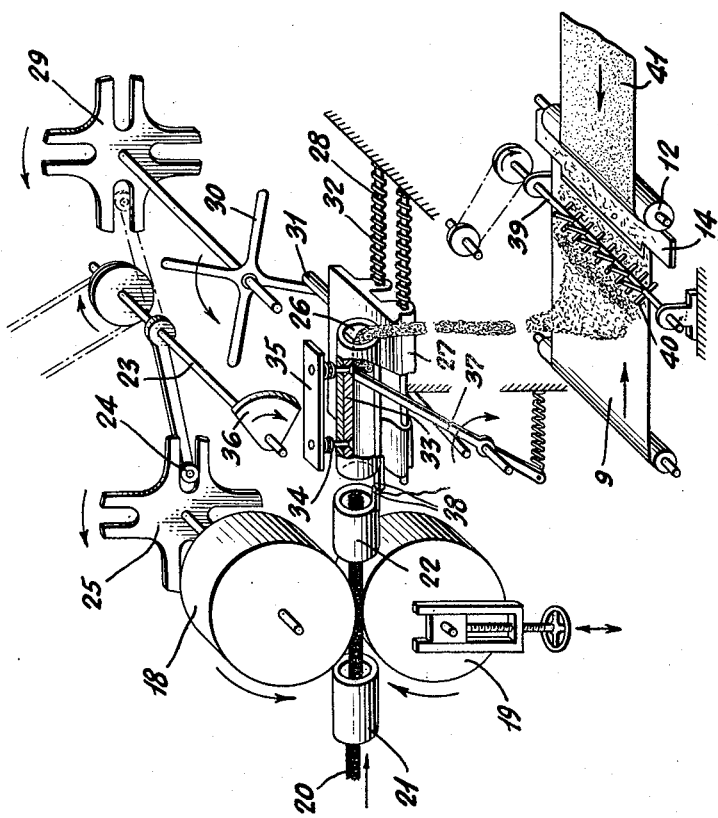
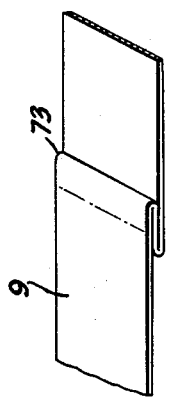
INVENTOR
P. F. SAPILEVSKY
BY
ATTORNEYS

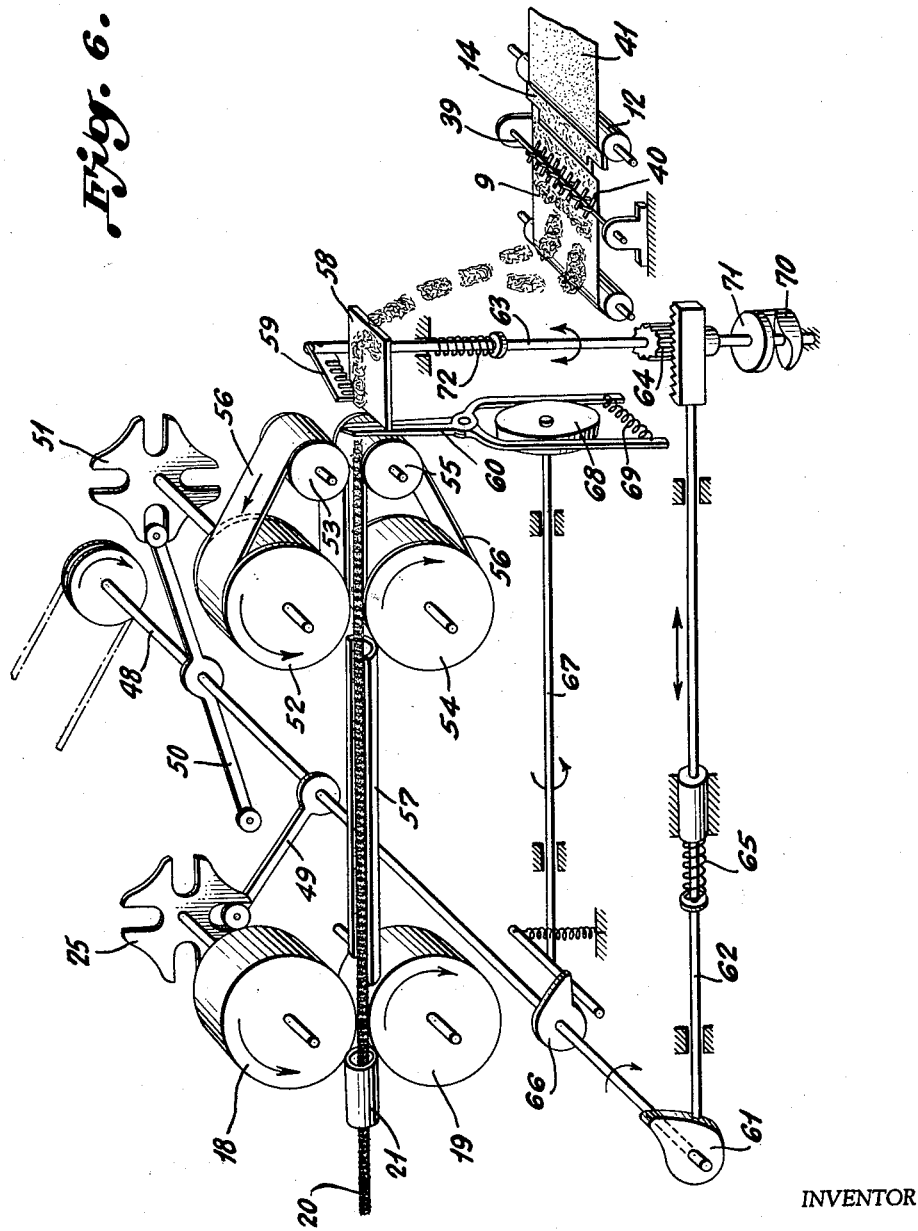

United States Patent Office 3,192,085
Patented June 29, 1965

3,192,085
PROCESS OF MANUFACTURING IMITATION PERSIAN LAMB CLOTH AND MACHINE FOR PRODUCING THE SAME
Piotr Filippovich Sapilevsky, Moscow, U.S.S.R., assignor to Moscovsky Experimentalny Zavod iskoosstvennoi Kozhi e mekha, Moscow, U.S.S.R.
Filed Apr. 4, 1960, Ser. No. 23,874
17 Claims. (Cl. 156—72)

The invention relates to a process of manufacturing imitation Persian lamb cloth and apparatus for producing the same.

The invention relates to the process apparatus for producing imitation Persian lamb cloth of different kinds.

It has previously been proposed to utilize curled chenille for producing imitation fur by securing it onto a suitable fabric backing covered with adhesive. The object of the present invention is to achieve a better simulation of the fur, eliminate gaps and produce different modifications of imitation Persian lamb cloth.

This object is achieved by feeding a continuous chenille strand or separate coils of chenille obtained by the doffing of coils from warp threads of preliminarily untwisted cut chenille to a backing. The simultaneous feed of several streams of coils separated from their cores and having different colours, diameters and forms allows the production of imitation furs of different kinds i.e. to simulate, for example, the appearance of the light or dark coloured dorsal ridge of grey astrakhan.

Moreover the pattern of the imitation Persian lamb produced from separate coils without a core, is free from repetition and continuity of the coils, which greatly enhances the simulation, renders the coils more flexible and capable of withstanding deformations occasioned by usage, reduces the weight, improves the drape and provides a warm feeling.

The appearance of the material simulating natural Persian lamb, depends in a great measure upon the proper regulation of the pressure exerted on the chenille or coils during their distribution and gluing onto the backing.

The weight, flexibility and diameter of the chenille or coils are subjected to changes depending upon the kind and number of fibers, the twist at curling and the amount of untwisting. Therefore it is of prime importance that the density of chenille or coils depending upon the clearance between the compression plate and distributing conveyor should be properly adjusted in running to suit the different conditions.

On the other hand, a modification in the diameter of the chenille or coils should not cause any change in the amount of compression of the chenille or coils with the fabric covered with adhesive, as otherwise this might bring about either squeezing-out of the adhesive or an insufficient immersion of the chenille or coils in the adhesive.

Therefore it is important that the increase or reduction of the chenille diameter is followed by a strictly coordinated corresponding change in the clearance between the take-up conveyor and the compression roller over which the adhesive-coated fabric passes.

It is also important to be able in situations where the diameter and flexibility of the moving chenille or coils are subject to changes, to adjust simultaneously while in motion the compression of the chenille or coils under the plate and the amount of pressure exerted upon the fabric coated with glue and the chenille or coils.

Moreover, in view of the fact that the required clearance between the compression roller and the take-up conveyor depends not only upon the chenille or coils but also on other factors which are independent of the texture of the chenille (i.e. the adhesive concentration and viscosity and the thickness of the adhesive coating), means should also be provided for permitting an additional individual correction of the clearance between the compression roller and the take-up conveyor.

For carrying out the aforementioned process, a machine is proposed, characterized in that the chenille or coils together with the fabric backing are threaded into a device for securing chenille or coils onto the fabric backing in closely adjacent curls through the shed formed between inner and outer continuous conveyor belts trained over a common rotating cylinder provided with heating elements, the conveyors moving at a speed less than the speed of a distribution conveyor feeding the chenille or coils. For adjusting the pressure exerted on the chenille or coils at the point of distribution and gluing onto the fabric backing the compression plate and fabric pressure roller are installed on common supports, and the compression roller is provided with means permitting an individual horizontal and vertical movement.

For producing imitation Persian lamb from coils (instead of chenille) the machine is provided with a device for obtaining coils by doffing curls from the warp threads of untwisted chenille. This device is made in form of a reciprocating carriage with a tube inside of which is located a clamping plate to grip the fiber of untwisted chenille which is periodically drawn into the tube.

In order to simplify the design an alternate device is proposed for producing coils by doffing the chenille curls from warp threads in which two continuous conveyor belts pressed together on a given section serve to grip and draw-out the fiber from preliminarily untwisted chenille; next to and following the conveyor belts are installed cutters for trimming the threads and a swing comb for throwing-off the coils and the cuttings of naked threads.

When utilizing coils there is provided above the distributing conveyor as a substitute for the pressure roller a changeable distribution roller having pins, which levels the coils and permits one layer of coils to pass under the compression plate.

Figure 2:
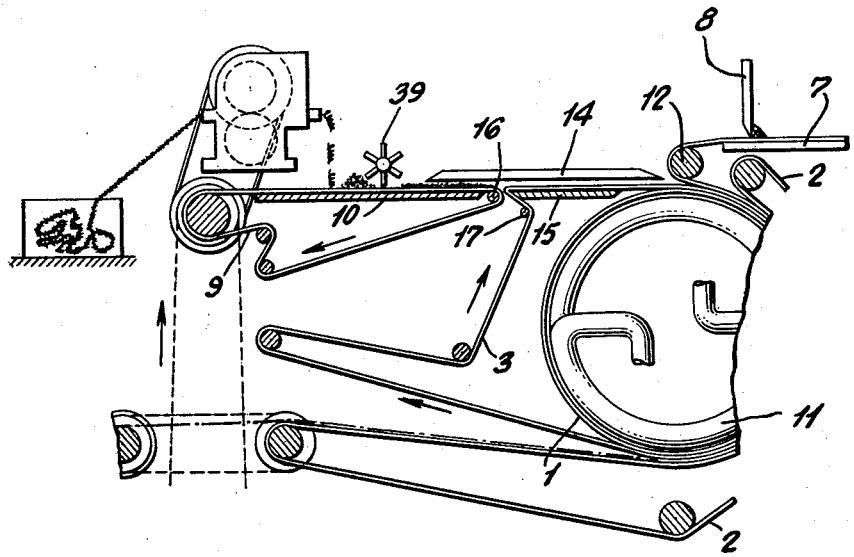
Figure 4:
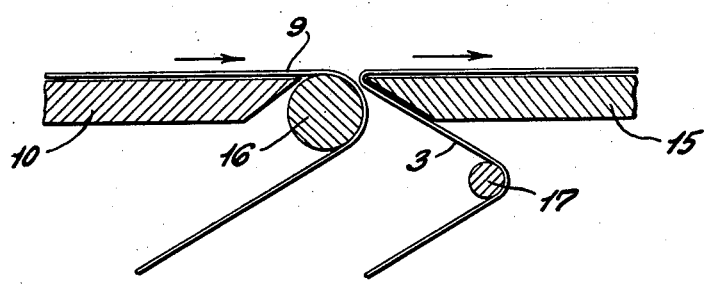
Figure 3:
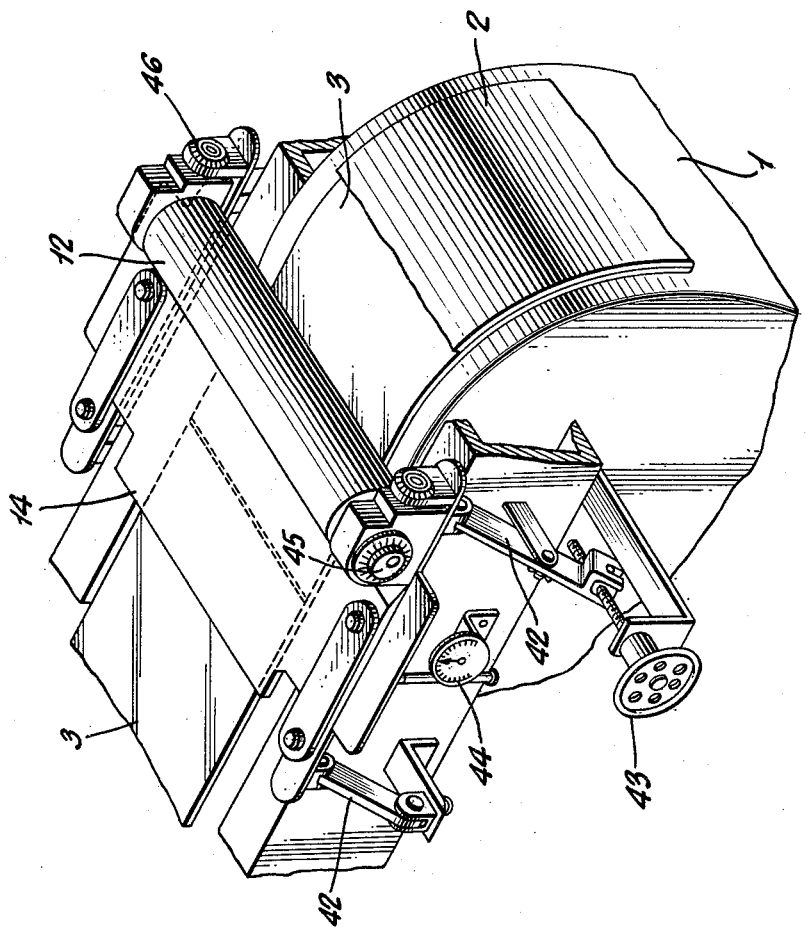

Further objects and advantages of the invention will be apparent from the following description taken in conjunction with the accompanying drawings wherein:

FIG. 1 is a diagrammatic view showing an apparatus for the continuous production of imitation Persian lamb cloth by providing a continuous feed of chenille to a fabric backing;

FIG. 2 a fragmentary diagrammatic view to an enlarged scale showing a portion of the apparatus shown in FIG. 1;

FIG. 3 a fragmentary view in perspective showing the means for adjusting the pressure applied to the chenille or coils while adhesively attaching the same to the fabric backing;

FIG. 4 is a fragmentary diagrammatic view showing the relationship between the feeding and assembling conveyors;

FIG. 5 a diagrammatic view showing a device for doffing chenille coils from warp threads and for depositing such coils in a uniform layer on a fabric backing;

FIG. 6 is a diagrammatic view showing another form of device for doffing chenille coils from warp threads; and FIG. 7 a fragmentary view in perspective showing the rib or pusher on one of the conveyor belts.

As illustrated by the diagrammatic showing in FIGS. 1 and 2, continuous conveyor belts 2 and 3 are trained over rotating cylinder 1 which may be driven in any suitable manner. The inner surface of the continuous belt of the conveyor 2 and the outer surface of the continuous belt of the conveyor 3 from a shed into which together with the fabric backing coming from the roll 6, is threaded either the chenille 4 from the reel 5, or the chenille coils.

Above the cylinder 1 is mounted the metal plate 7 and the doctor blade 8. Spaced from the cylinder 1 is located the feeding conveyor 9 and the table 10, and the speed of the conveyor 9 is greater than the speed of the conveyors 2 and 3. Inside the cylinder 1 are provided heating elements, as for example, the steam heated coil 11.

The fabric backing runs between the metal plate 7 and the doctor blade 8 which coats the fabric with a layer of adhesive, the thickness of the adhesive coating being regulated by the clearance between the edge of the doctor blade 8 and the plate 7.

The fabric backing running over the pressure roller 12 moves into engagement with the conveyor 3.

The chenille 4 is fed by the conveyor 9 and roller 13 under the compressing bar 14 and is engaged by the conveyor 3. The roller 13 is installed close to the leading edge of the compressing bar 14, the clearance between the roller 13 and the bar 14 being adjusted and in accordance with the material being utilized and the chenille is further compressed by pressure roller 12. When operating with the chenille coils (and not chenille) a device for curl doffing is used which, as illustrated in FIG. 5, comprises a pair of yieldable rollers 18 and 19 for periodically advancing chenille 20 through stationary guides 21 and 22. The rollers are periodically rotated from driving shaft 23 through crank 24 and Geneva wheel 25.

Following the guide 22 is coaxially mounted a tube 26 rigidly fixed on a carriage 27. The latter is mounted above feed conveyor 9 and has a reciprocating motion along the conveyor on guides 28. The moving of the carriage 27 to the right is effected by the same crank 24, interacting with the Geneva wheel 29 and by an arm of the star wheel 30 engaging the rest pin 31 provided on the carriage. The return stroke is accomplished by the compression spring 32.

The tube 26 is provided on the inside with a clamping plate 33 connected by means of spring-loaded pins 34 with the plate 35 which is engaged by the cam 36 rigidly fixed on the shaft 23.

At the bottom the tube 26 has a longitudinal slot, through which passes the upper end of a spring-loaded pusher-lever 37; on the adjacent end faces of the guide 22 and tube 26 are fixed knives 38 for trimming the warp threads.

Above the distribution conveyor 9 when utilizing chenille coils the pressure roller 13 (FIG. 1) is replaced by a changeable distribution roller 39 with pins 40, this roller being disposed close to the compressing bar 14; between this bar and the conveyor passes one layer of coils travelling to the fabric 41 coated with adhesive and running over the roller 12.

The device for doffing the curls operates as follows: When the tube 26 with the carriage 27 approaches close to the guide 22, the periodically rotating rollers 18 and 19 advance the chenille 20 into the tube 26. The plate 33 in the tube 26 clamps the chenille coil by means of the cam 36, and upon movement of the carriage and tube 26 to the right the coil is torn from the warp thread. At the same time the upper end of the pusher 37 moves to the right, sliding the coils along in the tube.

When the carriage reaches the extreme right-hand position it is returned by the compression springs 32 to its initial left-hand position; at this moment the upper end of the pusher 37 pushes the coils from the tube 26 onto the distribution conveyor 9, and the knives 38 trim the hanging ends of the warp threads. The chenille may be fed in several streams differing in colour, diameter and form of curls.

The coils discharged upon the conveyor 9, are carried by the latter to the distribution roller 39 with the pins 40, which upon rotation holds back surplus coils, preventing their accumulation at the edge of the compressing bar 14; subsequently the coils are deposited on the conveyor 3 (FIG. 1). As a result of the difference in the speeds of the conveyors 9 and 3 (FIG. 1) the chenille or coils are distributed in the form of curls.

In order to properly compress the coils of chenille on the conveyor 9 there may be provided, as shown in FIG. 7, one or more ribs or pushers 73 on the conveyor 9 and such ribs may be formed in any suitable manner. Movement of the conveyor 9 results in engagement of the rib or pusher 73 with the coils of chenille thereby compressing the same and precluding the formation of gaps between the coils.

For ensuring a smooth transition of the curls or coils of chenille from conveyor 9 onto conveyor 3 (FIG. 1), and for keeping the coil pattern in one plane and eliminating the dropping of chenille or coils between the conveyors, as may be seen in FIG. 4, the edge of the delivery table 15 upon which slides the belt of the conveyor 3, has a tapered angle adjacent the upper part of the supporting roller 16 of conveyor 9. The close contact of the conveyor 3 with the tapered edge is obtained by means of the stay rod 17. This provides an almost even plane in which a butt joint of the conveyors 9 and 3 is obtained.

To adjust the pressure exerted upon the chenille or coils during distribution and adhesively uniting to the fabric as may be seen in FIG. 3, the compressing bar 14 and pressure roller 12 are mounted on common supports 42 which are adjusted in relation to height by the screw arrangement 43, according to the indicator 44. Moreover, the horizontal and vertical positions of the roller 12 in relation to the conveyor 3 may be separately adjusted by means of the eccentric bushings 45 and screws 46.

The chenille or coils distributed in the form of curls are carried by the conveyor 3 under the fabric backing and together with the latter threaded into the space or shed between the conveyor belts 3 and 2. The fabric backing with the adhesively attached chenille or coils, compressed between the conveyor belts 3 and 2, runs over the cylinder 1, which serves to fix the pattern of curls and is thereafter carried by the conveyors 2 and 47 into the drying chamber shown in FIG. 1, where the imitation fur is subjected to final drying by a blast of hot air.

Heating of cylinder 1 provides for the preliminary setting of the adhesive and for removing elastic stresses from the compressed chenille curls.

When operating with coils a device of an alternate design may be used for doffing the curls from warp threads. This device is schematically shown in FIG. 6.

The device provides for the periodic advancement of the chenille 20 by means of a pair of elastic rollers 18, and 19 periodically rotated by the shaft 48 through the crank 49 and Geneva wheel 25. Upon the shaft 48 is also located the crank 50 with two pins, which interact with the Geneva wheel 51 fixed on the axle of the roller 52. The rollers 52 and 53, as well as the rollers 54 and 55 are in pairs over which are trained the conveyor belts 56.

Upon the rotation of the shaft 48 the yieldable rollers 18 and 19 and the coupled rollers 52–53 and 54–55 with the conveyor belts 56 rotate 90°. This provides for the advancement over a predetermined path length of the chenille 20 which is drawn through the tubular guide 21 and guide groove 57 and compressed between the rollers 18 and 19 and conveyor belts 56.

Upon subsequent rotation of the shaft 48, the crank 50 by means of second pin thereon another turns the Geneva wheel 51, driving the conveyor belts 56, while the rollers 18 and 19, holding the chenille 20 clamped between them, remain stationary. At the same time the conveyor belts 56 remove the chenille coils from the warp threads and deposit the coils on the table 58.

Upon further advancement the chenille, the warp thread substantially freed from curls and having only a small tuft of curls on the leading end is deposited on the table 58, whereupon the comb 59 operates to engage the previously removed coils together with the remaining tuft to remove the same from the warp thread and deposit the entire mass on the conveyor 9.

For lifting the comb 59 and bringing it over the coils on the table 58 a mechanism is provided consisting of cam 70, cam follower 71 and return spring 72.

The return movent of the comb 59 operates to move from the table 58 the naked warp threads trimmed from the chenille by the cutters 60. The movement of the comb 59 is caused by the interaction of the cam 61 attached to the shaft 48 with the rod 62 and engagement of the toothed rack on the rod 62 with the gear 64 on the shaft 63. The return movement of the comb takes place under the action of the return spring 65.

The naked thread is trimmed by a mechanism consisting of cam 66 on the shaft 48, rock shaft 67 to which is fixed cam 68 and cutters 60 with operating spring 69.

The whole cycle, comprising the operations of chenille feed, coil doffing and thread trimming, takes place during one revolution of the cam shaft 48.

It will be obvious to those skilled in the art that various changes may be made in the invention without departing from the spirit and scope thereof and therefore the invention is not limited by that which is shown in the drawings and described in the specification, but only as indicated in the appended claims.

What is claimed is:

1. A method of producing imitation Persian lamb cloth comprising the steps of applying an adhesive to a fabric backing, untwisting the core threads of curled chenille, intermittently feeding separate lengths of said chenille, doffing coils from the core threads of said chenille, depositing and distributing said coils on said fabric backing and setting said adhesive and pressing said coils to said backing by heat and pressure applied to said backing and coils.

2. An apparatus for producing imitation Persian lamb cloth, said apparatus comprising a heated rotated cylinder, a pair of super-imposed conveyor belts engaging a portion of the periphery of said cylinder, means for feeding a fabric backing having an adhesive applied thereto between said belts and a chenille feeding conveyor for depositing chenille on said fabric backing, said pair of belts and said cylinder serving to apply heat and pressure to said chenille and adhesive to set said adhesive and secure said chenille to said fabric backing.

3. An apparatus as defined in claim 2 in which said chenille feeding conveyor operates at a greater speed than said pair of belts.

4. An apparatus as defined in claim 2 and including a compressing bar for engaging said chenille prior to depositing the same on said fabric backing, a pressure roller for engaging said chenille after depositing the same on said fabric backing, common adjusting means for adjusting the pressure between said bar and roller and said chenille and additional adjusting means for adjusting said roller toward or away and along the path of travel of said chenille.

5. An apparatus for producing imitation Persian lamb cloth, said apparatus comprising a heated rotating cylinder, a pair of super-imposed conveyor belts engaging a portion of the periphery of said cylinder, means for feeding a fabric backing having an adhesive applied thereto between said belts, means for feeding separate lengths of chenille having an untwisted core, means for doffing coils from the warp threads of said chenille and means for depositing and distributing said coils on said fabric backing, said pair of belts and said cylinder serving to apply heat and pressure to said coils and adhesive to set said adhesive and secure said coils to said fabric backing.

6. An apparatus as defined in claim 5 in which said coil depositing means operates at a greater speed than said pair of belts.

7. An apparatus as defined in claim 5, and including a compressing bar for engaging said coils prior to depositing the same on said fabric backing, a pressure roller for engaging said chenille after depositing the same on said fabric backing, common adjusting means for adjusting the pressure between said bar and roller and said coils and additional adjusting means for adjusting said roller toward or away and along the path of travel of said coils.

8. An apparatus as defined in claim 5 in which said doffing means comprises a tubular guide, a reciprocating carriage, a tube on said carriage in alignment with said guide, means for feeding chenille through said guide into said tube and clamping means in said tube for clamping said chenille, whereby upon reciprocation of said carriage said clamping means will operate to pull coils from the warp threads of said chenille.

9. An apparatus as defined in claim 5 in which said coil distributing means comprises a rotatable shaft having a plurality of radially projecting pins for engaging said coils and distributing the same in a uniform layer.

10. An apparatus as defined in claim 5 in which said doffing means comprises a tubular guide, a pair of opposed contacting coil removing belts in alignment with said guide, means for intermittently driving said removing belts, means for feeding chenille through said guide and between said removing belts, said removing belts operating to pull coils from the warped threads of said chenille and deposit the same on a platform, intermittently operable cutting means following said removing belts for cutting the warp threads into short lengths and depositing the same on said platform and a swinging comb intermittently operable for removing said coils and threads as a mass from said platform.

11. A method of producing imitation Persian lamb cloth, said method comprising the steps of untwisting the core threads of curled chenille, periodically feeding separate lengths of said chenille, gripping said chenille and moving the same axially for extracting the core threads to provide separate curls, cutting said extracted threads, feeding said curls and uniformally depositing the same on a surface, compressing said curls in the direction of feed, compacting said curls from above toward said surface to provide a dense uniform mass, uniformally depositing said mass of curls on a fabric backing having an adhesive coating, applying pressure to said curls and backing for two to five minutes while heated to a temperature of from sixty to one hundred twenty degrees to press said curls to said backing and to partially set said adhesive, relieve the elastic tension in said curls, provide a stable immersion of said curls in said adhesive and provide a composite web and drying said web to complete the setting of said adhesive.

12. A method of producing imitation Persian lamb cloth, said method comprising the steps of untwisting the core threads of curled chenille, periodically feeding separate lengths of said chenille, gripping said chenille and moving the same axially for extracting the core threads to provide separate curls, cutting said extracted threads, feeding said curls and uniformally depositing the same on a surface, compressing said curls in the direction of feed, compacting said curls from above toward said surface to provide a dense uniform mass, uniformally depositing said mass of curls on a fabric backing having an adhesive coating, applying heat and pressure to said curls and backing to press said curls to said backing and to partially set said adhesive, relieve the elastic tension in said curls, provide a stable immersion of said curls in said adhesive and provide a composite web and drying said web to complete the setting of said adhesive.

13. A method of producing imitation Persian lamb cloth, said method comprising the steps of untwisting the core threads of curled chenille, periodically feeding separate lengths of said chenille, extracting the core threads to provide separate curls, cutting said extracted threads, feeding said curls and uniformally depositing the same on a surface, compressing said curls in the direction of feed, compacting said curls from above toward said surface to provide a dense uniform mass, uniformly depositing said mass of curls on a fabric backing having an adhesive coating, applying heat and pressure to said curls and backing to press said curls to said backing and to partially set said adhesive, relieve the elastic tension in said curls, provide a stable immersion of said curls in said adhesive and provide a composite web and drying said web to complete the setting of said adhesive.

14. A method of producing imitation Persian lamb cloth, said method comprising the steps of untwisting the core threads of curled chenille, periodically feeding separate lengths of said chenille, extracting the core threads to provide separate curls, cutting said extracted threads, feeding said curls and uniformly depositing same on a surface, treating said curls to provide a dense uniform mass, uniformly depositing said mass of curls on a fabric backing having an adhesive coating, applying heat and pressure to said curls and backing to press said curls to said backing and to partially set said adhesive, relieve the elastic tension in said curls, provide a stable immersion of said curls in said adhesive and provide a composite web and drying said web to complete the setting of said adhesive.

15. A method of producing imitation Persian lamb cloth, said method comprising the steps of untwisting the core threads of curled chenille, periodically feeding separate lengths of said chenille, extracting the core threads to provide separate curls, cutting said extracted threads, feeding said curls and uniformly depositing the same on a surface, treating said curls to provide a dense uniform mass, uniformly depositing said mass of curls on a fabric backing having an adhesive coating and applying heat and pressure to said curls and backing to press said curls to said backing and to set said adhesive, relieve the elastic tension in said curls, provide a stable immersion of said curls in said adhesive and provide a composite web.

16. An apparatus for producing imitation Persian lamb cloth, said apparatus comprising means for periodically feeding separate lengths of curled chenille having untwisted core threads, means for gripping the chenille and moving the same axially for extracting the core threads to provide separate curls, means for cutting the extracted threads, means for feeding said curls and depositing the same on a surface, means for compressing said curls in the direction of feed, means for compacting said curls from above toward said surface to provide a dense uniform mass, means for uniformly depositing said mass of curls on a fabric backing having an adhesive coating, means for applying heat and pressure to said curls and backing to press said curls to said backing and to partially set said adhesive and provide a composite web and means for drying said web to complete the setting of said adhesive.

17. A method of producing imitation Persian lamb cloth from curled chenille and a fabric backing, said method comprising the steps of feeding the curled chenille and uniformly depositing the same on a surface, compressing the curls of said chenille in the direction of feed, compacting said curls from above toward said surface to provide a dense uniform mass, uniformly depositing said mass of curls on a fabric backing having an adhesive coating, applying pressure to said curls and backing for two to five minutes while heated to a temperature of from sixty to one hundred twenty degrees to press said curls to said backing and to partially set said adhesive, relieve the elastic tension in said curls, provide a stable immersion of said curls in said adhesive and provide a composite web and drying said web to complete the setting of said adhesive.

References Cited by the Examiner

UNITED STATES PATENTS

| | | | |
|---|---|---|---|
| 1,012,389 | 12/11 | Marche | 156—72 |
| 1,314,529 | 9/19 | Marche | 156—72 |
| 1,731,591 | 10/29 | Romane | 156—148 |
| 1,822,510 | 9/31 | Smith | 156—435 |
| 1,950,416 | 3/34 | Romane | 154—76 |
| 2,005,049 | 6/35 | Romane | 156—519 |
| 2,116,048 | 5/38 | Smith | 156—435 |
| 2,188,156 | 1/40 | Plass | 156—72 |
| 2,768,671 | 10/56 | Schock | 156—435 |
| 2,787,571 | 4/57 | Miller | 156—72 |
| 2,925,359 | 2/60 | Burkholder | 156—72 |
| 2,931,418 | 4/60 | Paerse | 156—519 |

OTHER REFERENCES

Ser. No. 446,074, Bechetoille (A.P.C.), published June 1, 1943.

ALEXANDER WYMAN, *Primary Examiner.*

EARL M. BERGERT, HAROLD ANSHER, R. C. MADER, *Examiners.*